United States Patent Office 3,535,341
Patented Oct. 20, 1970

3,535,341
PROCESS FOR MAKING ALKYLENE CARBONATES
Albert H. Emmons and Ludo K. Frevel, Midland, Mich., assignors to The Dow Chemical Company, Midland, Mich., a corporation of Delaware
No Drawing. Filed Feb. 7, 1968, Ser. No. 703,535
Int. Cl. C07d 13/06
U.S. Cl. 260—340.2
4 Claims

ABSTRACT OF THE DISCLOSURE

In the reaction of carbon dioxide with an alkylene oxide to make a cyclic carbonate, high conversions and yields are obtained by using as the reaction catalyst hydrazine or a hydrazine hydrohalide. The catalyst can be reused in subsequent reactions.

BACKGROUND OF THE INVENTION

This invention concerns the use of a new catalyst whereby improved results are obtainable in the reaction of carbon dioxide and an alkylene oxide to produce the corresponding cyclic alkylene carbonate. The invention particularly concerns the use of hydrazine or a hydrazine salt to catalyze the aforesaid reaction.

The general conditions at which 1,2-alkylene oxides and carbon dioxide react to form a cyclic carbonate are well known. Generally, temperatures in the approximate range of 100–250° C. and superatmospheric pressure of about 10–300 atmospheres are employed. A reaction temperature of about 160-200° C. and a pressure of 50-150 atmospheres are usually preferred. The reactants are used in about equal molar proportions with the carbon dioxide normally in slight excess.

Known catalysts for the reaction include inorganic bases such as sodium hydroxide and sodium carbonate and organic nitrogen bases such as tertiary amines, quaternary ammonium bases, and salts of these nitrogen bases such as their carbonates and halides. For example, aliphatic tertiary amines such as trimethylamine, aromatic tertiary amines such as pyridine and quinoline, quaternary ammonium hydroxides such as tetraethyl ammonium hydroxide, trimethyl benzyl ammonium hydroxide, dialkyl piperidinium hydroxide, and the carbonates, bicarbonates, and halides of such hydroxides are all known to catalyze the reaction. Catalyst concentrations of 0.1–5 percent based on the weight of alkylene oxide are conventional.

These known catalysts are effective for the purpose and they provide fairly high conversions of the reactants and generally good yields of the desired cyclic carbonates. These yields usually are about 70–90 percent of the theoretical.

SUMMARY OF THE INVENTION

It has now been found that in the process whereby a cyclic alkylene carbonate is made by reacting an alkylene oxide with carbon dioxide under superatmospheric pressure at a temperature of about 100–250° C. and in the presence of a catalyst, nearly quantitative conversions of reactants and yields of carbonate are obtained when the catalyst is hydrazine or a hydrogen halide salt thereof.

DETAILED DESCRIPTION

A hydrazine halide catalyst can be the salt of any hydrogen halide, i.e., hydrogen fluoride, hydrogen chloride, hydrogen bromide, or hydrogen iodide. Preferably, hydrazine itself or its hydrochloride is employed.

A particular advantage of the present improved catalyst resides in the fact that it can be reused for subsequent reactions without need for regenerative treatment and without substantial loss of efficiency. Normally, the reaction mixture is distilled to separate the alkylene carbonate product, leaving the catalyst as the major component of the distillation residue. This residue can then be recycled directly to the process as the catalyst for a subsequent reaction.

The alkylene oxide reactant in the process can be any oxirane known to be operable in the reaction. The more common compounds of this class are represented by the general formula

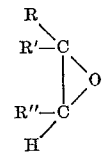

wherein R, R' and R" are each hydrogen, an alkyl radical of 1–6 carbon atoms, an alkenyl radical of 2–6 carbon atoms, a phenyl radical, or R and R' may be joined to form a cyclohexane ring and the oxirane compound is a cyclohexene oxide. The formula, therefore, represents 1,2-epoxides such as ethylene oxide, propylene oxide, butylene oxide, octene oxide, butadiene monoxide, styrene oxide, cyclohexene oxide, and methylcyclohexene oxide.

EXPERIMENTAL PROCEDURE

The reactor was a stainless steel pressure vessel equipped with a stirrer, means for measuring the temperature and pressure, and inlets connected to pressurized cylinders of carbon dioxide and alkylene oxide. The reactor was charged with 5 g. of catalyst (except in Example 2) and some of the desired alkylene carbonate product to act as a solvent for the catalyst, then it was sealed, pressured to about five atmospheres with carbon dioxide and heated. With the reactor at about 200° C. the reactor was pressurized to 300–600 lbs. gauge pressure of carbon dioxide and alkylene oxide was added intermittently with addition of carbon dioxide as required to maintain the original pressure. A total of 4 g. moles of alkylene oxide was added and carbon dioxide was added until the reactor pressure remained constant for one hour, indicating no further reaction. A slight molar excess of carbon dioxide based on the alkylene oxide was absorbed and reacted in each example.

After cooling and venting the reactor, the crude reaction product was analyzed, and in some cases the cyclic carbonate product was distilled from it. In Example 2 the distillation residue from Example 1 was used to catalyze the reaction. The following experiments were run at 200–210° C. with temperatures sometimes briefly higher from the exothermic reaction. Propylene oxide was the alkylene oxide reactant in each example.

| Example No. | Catalyst | Pressure, lbs. gauge | Time, hrs. | Conv., percent | Yield, percent |
|---|---|---|---|---|---|
| 1 | Hydrazine | 500 | 8.5 | 98.0 | 99.2 |
| 2 | Residue from (1) | 500 | 6.0 | 98.0 | 99.2 |
| 3 | Hydrazine dihydrochloride | 300–400 | 1.75 | 97.0 | 97.5 |
| 4 | Hydrazine dihydrobromide | 300–450 | 2.0 | 98.2 | 98.9 |

Similarly high conversions and yields of the cyclic carbonate are obtained as shown in the above examples when the epoxide reactant is another of the class defined by the generic formula, for example, ethylene oxide, styrene oxide, octene oxide, cyclohexene oxide, or butadiene monoxide.

Experiments otherwise similar to those shown above were performed using pyridine, trimethylamine carbonate, and tetraethylammonium carbonate as the reaction catalyst. In each case, the conversion of reactants and the yield of cyclic carbonate was each about 90 percent.

We claim:
1. In the process for making an alkylene carbonate which comprises reacting an alkylene oxide with carbon dioxide under superatmospheric pressure at a temperature of about 100–250° C. and in the presence of a catalyst, the improvement wherein said catalyst is hydrazine or the hydrogen halide salt thereof.
2. The process of claim 1 wherein the catalyst is hydrazine.
3. The process of claim 1 wherein the catalyst is hydrazine dihydrochloride.
4. The process of claim 1 wherein the alkylene oxide is propylene oxide.

References Cited

UNITED STATES PATENTS

| 2,766,258 | 10/1956 | Malkemus | 260—340.2 |
| 2,773,070 | 12/1956 | Lichtenwalter et al. | 260—340.2 |
| 2,773,881 | 12/1956 | Dunn | 260—340.2 |
| 2,873,282 | 2/1959 | McClellan | 260—340.2 |
| 2,993,908 | 7/1961 | Millikan et al. | 260—340.2 |

FOREIGN PATENTS 760,966  11/1956  Great Britain.

NORMA S. MILESTONE, Primary Examiner